Patented Dec. 6, 1938

2,139,069

UNITED STATES PATENT OFFICE 2,139,069

CONVERSION OF SPENT BATTERY PLATE POWDERS INTO LITHARGE

Robert M. Cole, Bryn Athyn, Pa.

No Drawing. Application April 21, 1936, Serial No. 75,553

2 Claims. (Cl. 23—146)

This invention relates to the conversion of spent battery plate powders into litharge and has for its primary objects the provision of a simple inexpensive and effective method for reclaiming the materials of battery plates and more particularly such powders.

The preferred method of practicing my invention is as follows: The metallic grids are drawn through a leaching tank as, for example, on a belt, to leach out acid, after which they are introduced into a hog mill for rough chopping or grinding. The cut-up material is then introduced into a ball mill and the powder from the spent plates is therein freed and separated by floating it off in water. The residues not carried off are then introduced into a melting pot and melted into hard lead.

The powder from the spent plates is then introduced into a calcining tube mill and therein calcined, the exhaust heat from the calcining mill being employed in the melting of the hard lead in the melting pot. The material introduced into the calcining mill is a mixture of four individuals, namely, lead peroxide ($PbO_2$), lead sulphate ($PbSO_4$), litharge (PbO) and metallic lead. The heat maintained in the calcining mill is preferably in the neighborhood of 700° C. to 800° C.

On calcining, the mixture of four individuals becomes a mixture of two, as follows. On heating, the lead peroxide loses oxygen and is converted to litharge (PbO). The lead sulphate remains unchanged as does the litharge. The metallic lead is oxidized and is converted into litharge.

This calcined mixture is now slowly fed into an agitated caustic soda solution of a temperature and concentration suitable for converting the lead sulphate to litharge. This operation may be carried out at atmospheric pressure or in an autoclave. If carried out at atmospheric pressure I prefer to use a solution in which the caustic soda has a concentration of 50% (or higher, depending on the temperature employed), the optimum temperature maintained being from about 300° C. to about 320° C. This gives the maximum conversion, although some conversion may take place at lower temperatures. If this operation is carried out in an autoclave, about a 10% solution of caustic soda is employed and a corresponding pressure of about 200 atmospheres is maintained to maintain the liquid environment, the temperature being as before stated.

The desired temperature can easily be maintained by fuel regulation in the autoclave or by means of the reflux condenser when operating at atmospheric pressure.

The caustic used is in amounts, substantially 85 parts of caustic per 305 parts of lead sulphate.

The yield is approximately theoretical.

The reaction of lead sulphate with caustic soda is as follows: $PbSO_4 + 2NaOH = PbO + Na_2SO_4$. The litharge is separated from the sodium sulphate by filtration and washing.

It will be seen from the foregoing that the end product of the process is thus litharge and of course the hard lead which is obtained by melting the residues from which the powders have been separated.

Intermediate the ball mill and the calcining mill, the mixture floating from the ball mill is dried in a drum dryer of which there may be a pair, one as a stand-by.

I claim:

1. The process of converting spent battery plate powders into substantially pure litharge and sodium sulphate, which comprises separating the powder from the metallic grids, calcining the separated powder to convert lead peroxide and metallic lead to litharge, mixing the calcined product with an aqueous solution of caustic soda, heating the same to a temperature of substantially 300° C. to substantially 320° C., and subjecting the entire mixture during this heating to a pressure sufficient to maintain the liquid environment for the calcined product, and thereafter separating the litharge from the sodium sulphate formed.

2. The process of converting spent battery plate powders into substantially pure litharge and sodium sulphate, which comprises separating the powder from the metallic grids, calcining the separated powder to convert lead peroxide and metallic lead to litharge, mixing the calcined product with an aqueous solution of caustic soda of about 10% concentration, heating the same to a temperature of substantially 300° C. to substantially 320° C., and subjecting the entire mixture during this heating to a pressure sufficient to maintain the liquid environment for the calcined product, and thereafter separating the litharge from the sodium sulphate formed.

ROBERT M. COLE.